March 4, 1930. W. H. ALLEN, SR., ET AL 1,749,205
POTATO HARVESTER
Filed Oct. 3, 1923 2 Sheets-Sheet 2
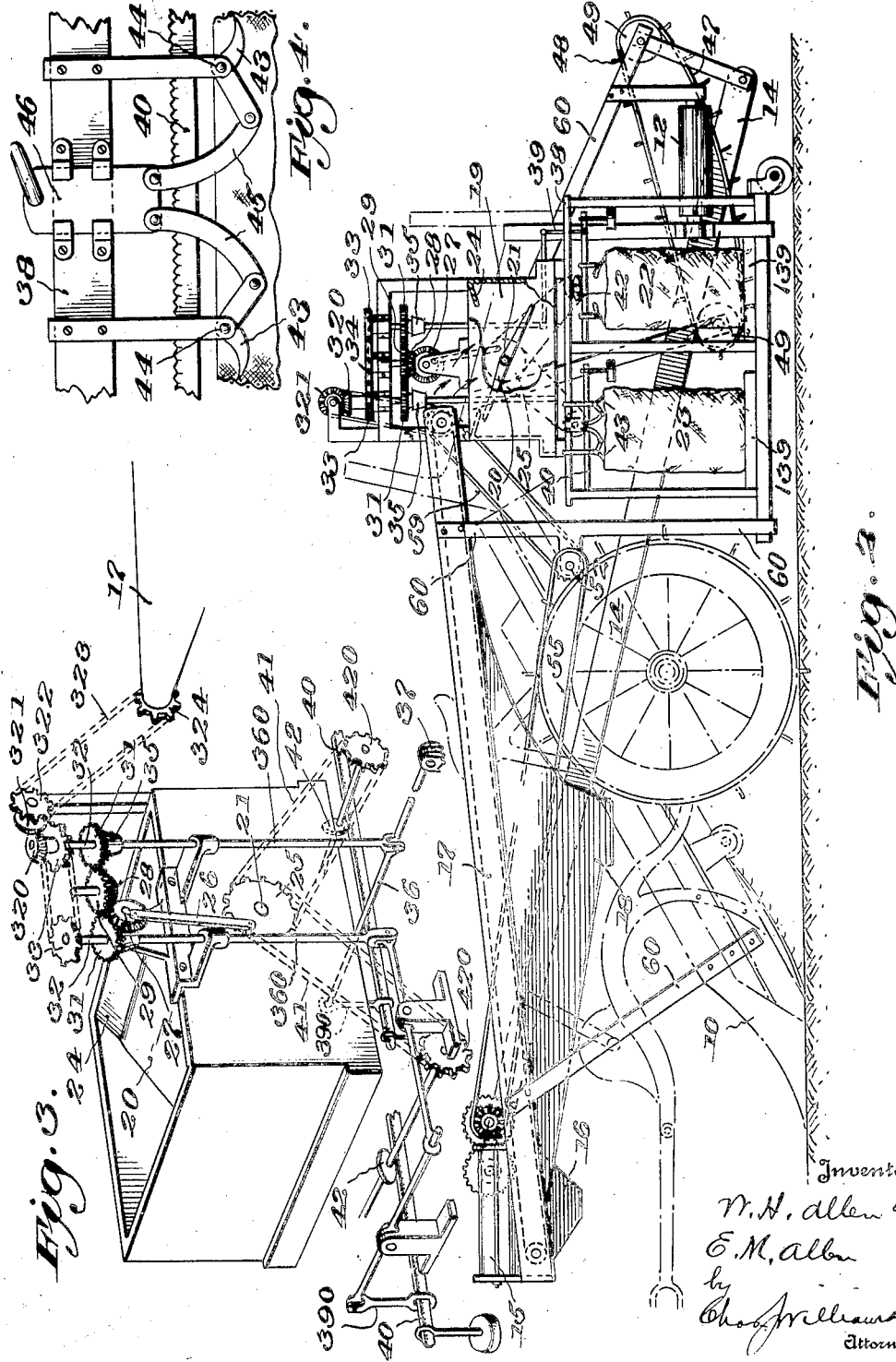

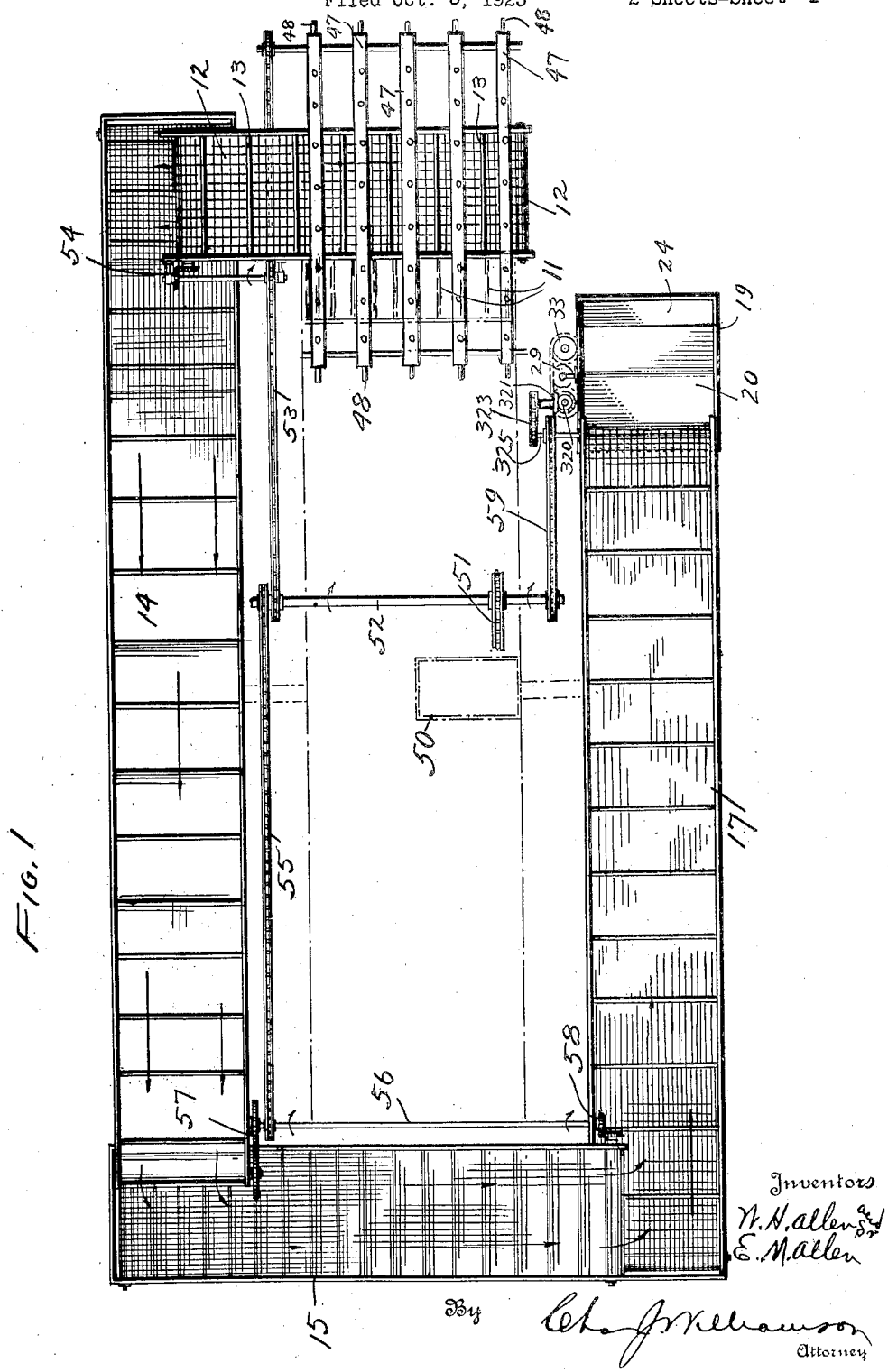

UNITED STATES PATENT OFFICE

WILLIAM HENRY ALLEN, SR., AND EDWIN M. ALLEN, OF FREEHOLD, NEW JERSEY; WILLIAM HENRY ALLEN, SR., ASSIGNOR TO PAULINE ELIZABETH ALLEN AND VIOLA CECELIA ALLEN, BOTH OF FREEHOLD, NEW JERSEY

POTATO HARVESTER

Application filed October 3, 1923. Serial No. 666,409.

The object of our invention is to use in connection with potato diggers, in particular, (though we do not restrict ourselves only to dealing with potatoes) means by which the potatoes as fast as they are dug will be sorted according to size and the first and second grades will be sacked and the first weighed, so as to reduce the manual work of handling to the minimum. Our invention consists in whatever is described by or is included within the terms or scope of the appended claims.

In the annexed drawings:

Fig. 1 is a top plan view of one embodiment of our invention, the dotted lines showing in a general way certain portions of a potato digger of ordinary construction with which our invention may be used;

Fig. 2 is a side elevation thereof also showing in dotted lines portions of the potato digger of ordinary construction with which our invention may be used.

Fig. 3 is a perspective view of the distributing and weighing devices;

Fig. 4 is a detail view in side elevation of the bag supporting devices.

Describing our invention with reference to its utilization in digging and harvesting potatoes, the potato digger shown in the drawing in dotted lines (and which is typified by what is shown in Patent No. 643,249, issued February 13, 1900) has as is usual a plow, 10, with rearwardly projecting rods, 11, and in rear of such rods and receiving the potatoes passing rearwardly therefrom is a transversely extending endless conveyor, 12, whose apron travels horizontally. Said apron preferably comprises wire netting which supports the potatoes while allowing dirt to fall therefrom and transverse slats or strips, 13, of wood for causing the potatoes to move onward along with the upper run of the belt and the potatoes are discharged therefrom at one end upon a similarly constructed endless band, 14, which extends longitudinally of the potato digger at one side thereof. The upper run of band 14 moves towards the front of the potato digger and from said endless band or conveyor, 14, the potatoes are delivered to a transversely extending endless band or conveyor, 15, which extends crosswise of the potato digger at the front thereof and which is similar to the other endless bands excepting that the transverse strips or slats are omitted. Such endless conveyor, 15, has as a function the grading of the potatoes by allowing the culls to fall through the wire mesh or netting by a discharge spout or chute, 16, which delivers the culls to a sack or other suitable receptacle, (not shown). Potatoes which constitute the first and second grades are delivered by the transversely extending screen conveyer, 15, to a similar longitudinally extending screen conveyer, 17, whose wire mesh or netting is coarser to allow the smaller second grade potatoes to fall therefrom to a chute, 18, by which they are delivered to a sack or other receptacle, (not shown).

The rear end of the screen conveyer, 17, is above a hopper, 19, to which the first grade potatoes are delivered within which hopper is pivoted a tilting or rocking platform, 20, whose upper surface is composed of two similar inclines which meet to form an apex above the pivot, 21, so that when such platform is rocked downward on one side it will direct the potatoes from the hopper at one side thereof for delivery to a sack, 22. The sack is supported in position to receive potatoes at that point, while when the platform is rocked downward to the other side it will direct potatoes to another sack, 23, supported to receive the potatoes on that side, the platform, 20, being in effect a valve which in one position permits passage of potatoes to one sack while preventing the passage of potatoes to the other sack. At either side of the hopper above the tilting platform 20, is a downwardly inclined shelf, 24, which reaches across the space from the hopper side to the edge of platform, 20, when one of its inclined top surfaces acts to stop the fall of potatoes to the sack on that side, so that potatoes falling from the endless band or conveyer, 17, will not be damaged.

The to and fro motion of the tilting platform or valve 20, is automatically produced, it being shifted when a sack is filled from the position directing potatoes to that sack to a position to cut them off from that sack and deliver them to the other sack. For producing that action, we connect with the platform, 20, a disk or wheel, 25, which may be fixed to the pivot, 21, which by a pitman 26, is connected to a wheel, 27. The wheel has bevel teeth which mesh with a bevel gear, 28, on one face of a spur gear, 29, on a shaft, 30, which gear, 29, lies between and meshes with spur gears, 31, each on a vertical shaft, 32. Either wheel, 31, at a time serves to rotate the intermediate gear, 29, in one direction or the other and thus to rock the valve, 20, in one direction or the other. The gears, 31, are rotated in the same direction, their shafts, 32, being connected by sprocket gearing that comprises a sprocket wheel, 33, on each shaft, and a sprocket chain, 34, connecting such wheels. The gears, 31, are loose on their respective shafts, 32, and each at a time may be clutched to its shaft by a clutch, 35, which is automatically moved into engaging position when a sack is wholly filled with potatoes and is automatically disengaged when a sack is empty so that though the shafts, 31, are continuously revolved by connection with a suitable source of power only one gear, 31, at a time is revolved.

The clutch, 35, is actuated by a lever, 36, pivoted to a bracket, 37, secured to the horizontal frame arm, 38, of a platform scale, 139, on which one sack or the other is mounted. Extending from the lever, 36, near one end is a rod, 390, whose lower end engages the scale beam, 40, so that when such scale beam is depressed due to the absence of the proper weight of potatoes in the bag the clutch operating lever, 36, will occupy a position to disengage the clutch, while when the scale beam, 40, rocks upward under the desired weight of potatoes the lever, 36, will engage the clutch and cause the tilting of the platform or the valve, 20. The clutch operating lever, 36, acts upon the clutch through a vertical rod, 360, the construction of the clutch being such that when the rod is moved upward the gear, 31, is clutched to the shaft and when the rod is moved downward such gear is unclutched from the shaft. It has not been considered necessary to illustrate the construction of the clutch in detail. As soon as the tilting of the valve, 20, occurs the unclutching of the active gear, 31, is produced by a connection with the wheel, 25, by means of a sprocket chain, 41, with each scale which runs to a sprocket wheel, 420, on a shaft pivoted to the scale frame arm, 38, on which shaft is an elliptical cam or rocker, 42, adapted when turned to one position to depress the scale beam, 40, and in the other position not to interfere with the lifting of the scale beam under the predetermined load of potatoes. On one of the shafts, 32, is a bevel gear, 320, with which meshes a bevel gear, 321, on a shaft having a sprocket wheel, 322 (best shown in Fig. 3) which by a sprocket chain, 323, receives motion from a sprocket wheel, 324, on the shaft, 325, of the rear roller of the endless conveyor, 17.

Suitable means should be provided to hold the mouth of the bags or sacks on the scales in an open position. Such means may be sharpened extremities of angle levers, 43, attached each by a pivot, 44, to the scale frame arm, 38, in position to engage the open mouth of the sack at one side, each lever, 43, being connected by a link, 45, with a vertically slidable bar, 46, mounted between guides on the scale arm, 38, so that when said bar, 46, is lowered the levers, 43, will be rocked outward to engage their sharp ends in the sack. When said bar, 46, is lifted the levers, 43, will be moved inward away from the sides of the sack to free them. See Fig. 4 for the best illustration of the bag holders. In Fig. 2 one is shown partly broken away to show the device behind.

To prevent weeds or débris passing with potatoes to the transversely extending conveyor, 12, which first receives the potatoes from the rods, 11, there is a longitudinally extending conveyor in the form of a number of parallel endless bands, 47, with spaced teeth, 48, which pass over transversely extending rollers, 49, at front and rear of the conveyor, 12, respectively, the upper runs of which endless bands pass above the conveyor, 12, and the other runs below it and thus brush or other débris will be prevented from falling on the conveyor, 12, and will be discharged to the ground in rear thereof. The trash is thrown to the conveyor, 47, by the usual kickers with which potato diggers are provided. By employing parallel spaced bands, 47, the potatoes will fall readily to the cross conveyor, 12.

The conveyors and other parts requiring motion take their power from the engine, 50, with which the potato digger is equipped by sprocket gearing, 51, that drives a cross shaft, 52, from which sprocket gearing, 53, drives the conveyor 12, and the rear roller, 49. The driving connections for the conveyor, 12, include shaft and bevel gearing, 54, and by sprocket gearing, 55, a cross shaft, 56, is driven which by gearing, 57, drives the endless conveyor, 14, and gearing, 58, drives the cross conveyor, 15. The conveyor, 17, is driven by sprocket gearing, 59, from the cross shaft 52.

The parts of our mechanism are supported by suitable framework from the frame of the potato digger such framework including bars, 60, whose arrangement need not be described in detail.

By means of our additions to an ordinary potato digger the potatoes are harvested directly from the digger by mechanical means, they are cleaned and sorted, the different grades being delivered to as many different receptacles, and those of the first grade are automatically bagged with the right weight, so that no manual labor in handling the potatoes between digging and sacking is required. Our invention may be used with a horse-drawn potato digger or with a motor driven digger and power to operate our mechanism can readily be obtained from the driving wheels of the digger or from a motor if the digger is motor driven.

What we claim is:

1. A frame having a conveyor extending transversely thereof in position to receive vegetables, an endless conveyer extending forwardly of the frame at one side thereof, an endless screen conveyer extending transversely of the frame at the front thereof, and an endless screen conveyer extending rearwardly at the other side of the frame, the vegetables in assorted sizes being delivered from said screen conveyors, and transporting means situated between the two side conveyors.

2. A frame having a conveyor extending transversely thereof in position to receive vegetables, an endless conveyer extending forwardly of the frame at one side thereof, an endless screen conveyer extending transversely of the frame at the front thereof, an endless screen conveyer extending rearwardly at the other side of the frame, the vegetables in assorted sizes being delivered from said screen conveyers, and transporting means situated between the two side conveyors, and sacking means receiving vegetables from said last named screen conveyer.

3. A frame having a conveyor in position to receive vegetables, an endless conveyor extending forwardly of the frame at one side thereof, an endless screen conveyor extending transversely of the frame at the front thereof, and an endless screen conveyor extending rearwardly at the other side of the frame, the vegetables in assorted sizes being delivered from said screen conveyor, and weighing mechanism situated at the rear end of said endless screen conveyor.

4. In combination with vegetable transporting means, means for cleaning and grading vegetables comprising a frame having a conveyor situated below said first mentioned means to receive the vegetables to be cleaned and graded with openings for the passage of vegetables, and a second conveyor extending transversely of said first mentioned conveyor and beneath the same to receive vegetables falling through said openings, said second named conveyor having a discharge point at one side of said first mentioned conveyor, and means to receive vegetables at said discharge point.

5. Means for cleaning and grading vegetables comprising a frame that is transportable from place to place, a conveyor that extends and moves longitudinally of the direction of movement of the machine in transportation from place to place and situated at the rear of the frame to receive the vegetables to be cleaned and graded, with openings for the passage downward of vegetables, a second conveyor extending transversely of said first-mentioned conveyor and beneath the same to receive vegetables falling through said openings, said second conveyor having a discharge point at one side of said first-mentioned conveyor, and a third conveyor extending and moving in the same direction as the first-mentioned conveyor which has a receiving portion for vegetables traveling past said discharge point, a conveyor at the front of said frame extending cross-wise from a point beneath the discharge end of said third-mentioned conveyor and having a discharge point away from said third-mentioned conveyor.

In testimony whereof we hereunto affix our signatures.

WILLIAM HENRY ALLEN, Sr.
EDWIN M. ALLEN.